(12) United States Patent
Yang et al.

(10) Patent No.: US 10,505,779 B2
(45) Date of Patent: Dec. 10, 2019

(54) METHOD AND APPARATUS FOR OBTAINING DOWNLINK CHANNEL INFORMATION AND NETWORK SIDE DEVICE

(71) Applicant: HUAWEI TECHNOLOGIES CO., LTD., Shenzhen, Guangdong (CN)

(72) Inventors: Jing Yang, Shanghai (CN); Ni Ma, Shanghai (CN); Peigang Jiang, Shanghai (CN); Wei Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 15/662,964

(22) Filed: Jul. 28, 2017

(65) Prior Publication Data

US 2017/0331661 A1    Nov. 16, 2017

Related U.S. Application Data

(63) Continuation of application No. PCT/CN2015/072033, filed on Jan. 30, 2015.

(51) Int. Cl.
*H04L 27/28* (2006.01)
*H04L 25/02* (2006.01)
(Continued)

(52) U.S. Cl.
CPC ........... *H04L 27/28* (2013.01); *H04B 7/0456* (2013.01); *H04L 25/021* (2013.01);
(Continued)

(58) Field of Classification Search
CPC ... H04L 27/28; H04L 25/0202; H04L 25/021; H04B 7/0456–0486; H04B 7/0452;
(Continued)

(56) References Cited

U.S. PATENT DOCUMENTS

2010/0238824 A1   9/2010 Farajidana et al.
2011/0032839 A1   2/2011 Chen et al.
(Continued)

FOREIGN PATENT DOCUMENTS

CN   102349274 A   2/2012
CN   102687436 A   9/2012
(Continued)

OTHER PUBLICATIONS

International Search Report dated Sep. 25, 2015 in corresponding International Patent Application No. PCT/CN2015/072033.
(Continued)

*Primary Examiner* — Eric Myers
(74) *Attorney, Agent, or Firm* — Leydig, Voit & Mayer, Ltd.

(57) ABSTRACT

This application provides a method for obtaining downlink channel information. The method includes: performing precoding weighting on M CSI-RSs of each of N sub-cycles, where each sub-cycle is a quantity of measurement pilot subframes for bearing and transmitting the M CSI-RSs; sending the M weighted CSI-RSs to UE; receiving M PMIs and M CQIs that are sent by the UE and that correspond to the M CSI-RSs, where the M PMIs and the M CQIs are obtained by the UE by separately measuring the M weighted CSI-RSs based on a set a rank 1 precoding codebooks corresponding to the predetermined antenna quantity; obtaining M signal-to-noise ratios of a downlink channel of the UE according to the M CQIs; obtaining M equivalent codebooks according to the M PMIs and weights of the precoding weighting; and obtaining a covariance matrix according to the M signal-to-noise ratios and the M equivalent codebooks.

14 Claims, 6 Drawing Sheets

(51) Int. Cl.
  *H04W 72/04* (2009.01)
  *H04B 7/0456* (2017.01)
  *H04B 7/0452* (2017.01)
  *H04B 7/06* (2006.01)

(52) U.S. Cl.
  CPC ......... *H04W 72/042* (2013.01); *H04B 7/0452* (2013.01); *H04B 7/0632* (2013.01); *H04B 7/0639* (2013.01)

(58) Field of Classification Search
  CPC . H04B 7/0632; H04B 7/0639; H04W 72/042; H04W 72/08–085
  See application file for complete search history.

(56) References Cited

U.S. PATENT DOCUMENTS

| | | | |
|---|---|---|---|
| 2011/0194632 A1 | 8/2011 | Clerckx et al. | |
| 2011/0319027 A1 | 12/2011 | Sayana et al. | |
| 2012/0257683 A1 | 10/2012 | Schwager et al. | |
| 2012/0320783 A1 | 12/2012 | Wu et al. | |
| 2015/0016379 A1 | 1/2015 | Nam et al. | |
| 2015/0289155 A1* | 10/2015 | Gao | H04L 5/0057 370/252 |
| 2017/0070334 A1 | 3/2017 | Hammarwall | |
| 2017/0141834 A1 | 5/2017 | Yang et al. | |
| 2018/0176809 A1 | 6/2018 | Gao | |

FOREIGN PATENT DOCUMENTS

| | | |
|---|---|---|
| CN | 103155624 A | 6/2013 |
| EP | 2819313 A1 | 12/2014 |
| JP | 2015513257 A | 4/2015 |
| JP | 2015521420 A | 7/2015 |
| JP | 2017528955 A | 9/2017 |
| WO | 2008/051845 A2 | 5/2008 |
| WO | 2013169197 A1 | 11/2013 |
| WO | 2014079329 A1 | 5/2014 |

OTHER PUBLICATIONS

International Search Report dated Sep. 25, 2015 in corresponding International Application PCT/CN2015/072033.
Notice of Allowance, dated Sep. 21, 2018, in Japanese Application No. 2017540591 (3 pp.).
Extended European Search Report dated Nov. 17, 2017 in corresponding European Patent Application No. 15879463.6.
Qubin Gao et al.: "Utilization of Channel Reciprocity in Advanced MIMO System," Communications and Networking in China (Chinacom), 2010 5$^{th}$ International ICST Conference on, IEEE, Piscataway, NJ, USA Aug. 25, 2919, pp. 1-5, XP031847202.
Korean Office Action dated Mar. 18, 2019 in related Korean Application No. 10-2017-7023386 with English Translation (10 pages).

* cited by examiner

METHOD AND APPARATUS FOR OBTAINING DOWNLINK CHANNEL INFORMATION AND NETWORK SIDE DEVICE

CROSS-REFERENCE TO RELATED APPLICATIONS

This application is a continuation of International Application No. PCT/CN2015/072033, filed on Jan. 30, 2015, the disclosure of which is hereby incorporated by reference in its entirety.

TECHNICAL FIELD

This application relates to the field of communications technologies, and in particular, to a method and an apparatus for obtaining downlink channel information and a network side device.

BACKGROUND

Multi-user multiple-input multiple-output MU-MIMO) technologies are widely applied to both conventional non line of sight (NLOS) outdoor macro base station scenarios in which there are relatively many obstructions and reflections, and direct line of sight (LOS) indoor scenarios (for example, distributed MIMO) in which there are relatively few obstructions and reflections.

In an MU-MIMO system, when multiple users transmit data on a same time-frequency resource, each user not only receives data streams sent from a base station to the user, but also receives interference signals from other users. An effective solution to effectively suppress interference between users and improve system capacity and spectral efficiency is a beamforming (BF) technology, that is, a base station side performs weighting by using a pre-designed beamforming vector before transmitting data, so that a main lobe of an antenna directivity pattern is aligned with a user direction and a null point is aligned with an interference direction when the base station sends data of the user, thereby improving a signal-to-noise ratio of a direction of arrival of user equipment (UE) and achieving the objective of interference suppression.

However, to design a beamforming vector in null space of an interference user, the base station side needs to know downlink channel information of the user.

In a frequency division duplex (FDD) system in which an uplink and a downlink are asymmetric, a base station cannot obtain downlink channel information by using an uplink channel.

In a time division duplex (TDD) system in which only one antenna participates in uplink transmission and two antennas participate in downlink reception, due to reciprocity between an uplink channel and a downlink channel, a base station can obtain half of downlink channel information by measuring the uplink channel, but cannot obtain complete downlink channel information from the TDD system.

SUMMARY

This application provides a method and apparatus for obtaining downlink channel information and a network side device, so as to resolve a technical problem in the prior art that a network side device cannot obtain downlink channel information of a user.

A first aspect of this application provides a method for obtaining downlink channel information, including:

performing, by a network side device, precoding weighting on M channel state information-reference signals (CSI-RSs) of each of N sub-cycles in a cycle, where each sub-cycle is a quantity of measurement pilot subframes for bearing and transmitting the M CSI-RSs, N is a positive integer, and M is a quantity of CSI-RSs required by a predetermined antenna quantity;

sending, by the network side device, the M weighted CSI-RSs of each sub-cycle to user equipment (UE);

receiving, by the network side device, M precoding matrix indicators (PMIs) and M channel quality indicators (CQIs) that are sent by the UE and that correspond to the M CSI-RSs of each sub-cycle, where the M PMIs and the M CQIs are obtained by the UE by separately measuring the M weighted CSI-RSs based on a set of rank 1 precoding codebooks corresponding to the predetermined antenna quantity;

obtaining, by the network side device M signal-to-noise ratios of a downlink channel of the UE according to the M CQIs of each sub-cycle;

obtaining, by the network side device, M equivalent codebooks according to the M PMIs of each sub-cycle and weights of the precoding weighting; and obtaining, by the network side device according to the M signal-to-noise ratios of the downlink channel and the M equivalent codebooks, a covariance matrix of the downlink channel of the UE as the downlink channel information.

With reference to the first aspect, in a first possible implementation manner of the first aspect, before the receiving, by the network side device, M precoding matrix indicators (PMIs) and M channel quality indicators (CQIs) that are sent by the UE and that correspond to the M CSI-RSs of each sub-cycle, the method further includes;

sending, by the network side device, the set of rank 1 precoding codebooks corresponding to the predetermined antenna quantity, to the UE.

With reference to the first aspect or the first possible implementation manner of the first aspect, in a second possible implementation manner of the first aspect, if N is greater than or equal to 2, before the sending, by the network side device, the M weighted CSI-RSs of each sub-cycle to user equipment UE, the method further includes:

weighting, by the network side device, the M CSI-RSs of each sub-cycle by using a power control factor that corresponds to each sub-cycle; and the obtaining, by the network side device, M signal-to-noise ratios of a downlink channel of the UE according to the M CQIs of each sub-cycle includes:

obtaining, according to the M CQIs of each sub-cycle and the power control factor used in each sub-cycle, the M signal-to-noise ratios of the downlink channel that correspond to each sub-cycle; and obtaining an average signal-to-noise ratio of all of the M signal-to-noise ratios of the downlink channel that correspond to each sub-cycle, and using the average signal-to-noise ratios as the M signal-to-noise ratios of the downlink channel of the UE.

With reference to the first aspect, the first possible implementation manner of the first aspect, or the second possible implementation manner of the first aspect, in a third possible implementation manner of the first aspect, after the obtaining a covariance matrix of the downlink channel according to the M signal-to-noise ratios of the downlink channel and the M equivalent codebooks, the method further includes:

performing, by the network side device, beamforming weighting processing on downlink data of the UE according to the covariance matrix.

A second aspect of this application provides an apparatus for obtaining downlink channel information, including:

a processing unit, configured to perform precoding weighting on M channel state information-reference signals (CSI-RSs) of each of N sub-cycles in a cycle, where each sub-cycle is a quantity of measurement pilot subframes for bearing and transmitting the M CSI-RSs, N is a positive integer, and M is a quantity of CSI-RSs required by a predetermined antenna quantity;

a sending unit, configured to send die M weighted CSI-RSs of each sub-cycle to user equipment (UE); and a receiving unit, configured to receive M precoding matrix indicators (PMIs) and M channel quality indicators (CQIs) that are sent by the UE and that correspond to the M CSI-RSs of each sub-cycle, where the M PMIs and the M CQIs are obtained by the UE by separately measuring the M weighted CSI-RSs based on a set of rank 1 precoding codebooks corresponding to the predetermined antenna quantity; and the processing unit is further configured to: obtain M signal-to-noise ratios of a downlink channel of the UE according to the M CQIs of each sub-cycle; obtain M equivalent codebooks according to the M PMIs of each sub-cycle and weights of the precoding weighting; and obtain, according to the M signal-to-noise ratios of the downlink channel and the M equivalent codebooks, a covariance matrix of the downlink channel of the UE as the downlink channel information.

With reference to the second aspect, in a first possible implementation manner of the second aspect, the sending unit is further configured to: before the receiving unit receives the M precoding matrix indicators (PMIs) and the M channel quality indicators (CQIs) that are sent by the UE and that correspond to the M CSI-RSs of each sub-cycle, send the set of rank 1 precoding codebooks corresponding to the predetermined antenna quantity to the UE.

With reference to the second aspect or the first possible implementation manner of the second aspect, in a second possible implementation manner of the second aspect, when N is greater than or equal to 2, the processing unit is further configured to: before the sending unit sends the M weighted CSI-RSs of each sub-cycle to the user equipment UE, weight the M CSI-RSs of each sub-cycle by using a power control factor that corresponds to each sub-cycle;

obtain, according to the M CQIs of each sub-cycle and the power control factor used in each sub-cycle, the M signal-to-noise ratios of the downlink channel that correspond to each sub-cycle: and obtain an average signal-to-noise ratio of all of the M signal-to-noise ratios of the downlink channel that correspond to each sub-cycle, and use the average signal-to-noise ratios as the M signal-to-noise ratios of the downlink channel of the UE.

With reference to the second aspect, the first possible implementation manner of the second aspect, or the second possible implementation manner of the second aspect, in a third possible implementation manner of the second aspect, the processing unit is further configured to perform beamforming weighting processing on downlink data of the UE according to the covariance matrix.

With reference to any one of the second aspect, or the first possible implementation manner of the second aspect to the third possible implementation manner of the second aspect, in a fourth possible implementation manner of the second aspect the apparatus is a base station.

A third aspect of this application provides a network side device, including:

a processor, configured to perform precoding, weighting on M channel state information-reference signals (CSI-RSs) of each of N sub-cycles in a cycle, where each sub-cycle is a quantity of measurement pilot subframes for bearing and transmitting the M CSI-RSs, N is a positive integer, and M is a quantity of CSI-RSs required by a predetermined antenna quantity;

a transmitter, configured to send the M weighted CSI-RSs of each sub-cycle to user equipment (UE); and a receiver, configured to receive M precoding matrix indicators (PMIs) and M channel quality indicators (CQIs) that are sent by the UE and that correspond to the M CSI-RSs of each sub-cycle, where the M PMIs and the M CQIs are obtained by the UE by separately measuring the M weighted CSI-RSs based on a set of rank 1 precoding codebooks corresponding to the predetermined antenna quantity; and the processor is further configured to: obtain M signal-to-noise ratios of a downlink channel of the UE according to the M CQIs of each sub-cycle; obtain M equivalent codebooks according to the M PMIs of each sub-cycle and weights of the precoding weighting; and obtain a covariance matrix of the downlink channel of the UE according to the M signal-to-noise ratios of the downlink channel and the M equivalent codebooks.

With reference to the third aspect, in a first possible implementation manner of the third aspect, the transmitter is further configured to; before the receiver receives the M precoding matrix indicators (PMIs) and the M channel quality indicators (CQIs) that are sent by the UE and that correspond to the M CSI-RSs of each sub-cycle, send the set of rank 1 precoding codebooks corresponding to the predetermined antenna quantity to the UE.

With reference to the third aspect or the first possible implementation manner of the third aspect, in a second possible implementation manner of the third aspect, if N is greater than or equal to 2, the processor is further configured to: before the transmitter sends the M weighted CSI-RSs of each sub-cycle to the user equipment UE, weight the M CSI-RSs of each sub-cycle by using a power control factor that corresponds to each sub-cycle;

obtain, according to the M CQIs of each sub-cycle and the power control factor used in each sub-cycle, the M signal-to-noise ratios of the downlink channel that correspond to each sub-cycle; and obtain an average signal-to-noise ratio of all of the M signal-to-noise ratios of the downlink channel that correspond to each sub-cycle, and use the average signal-to-noise ratios as the M signal-to-noise ratios of the downlink channel of the UE.

With reference to the third aspect, the first possible implementation manner of the third aspect, or the second possible implementation manner of the third aspect, in a third possible implementation manner of the third aspect, the processor is further configured to perform beamforming weighting processing on downlink data of the UE according to the covariance matrix.

With reference to any one of the third aspect, or the first possible implementation manner of the third aspect to the third, possible implementation manner of the third aspect, in a fourth possible implementation manner of the third aspect, the network side device is a base station.

One or more technical solutions according to embodiments of this application have at least the following technical effects or advantages.

In the embodiments of this application, precoding weighting is performed on CSI-RSs sent by a network side device to UE, and the UE measures the CSI-RSs based on a set of rank 1 codebooks corresponding to a predetermined antenna quantity, that is, codebooks are constrained. Therefore, PMIs obtained by means of measurement are also codebook-constrained. With the constraint of rank 1 codebooks, the network side device can calculate signal-to-noise ratios of a downlink channel of the UE according to CQIs, obtain equivalent codebooks according to the PMIs measured by the UE and weights of the precoding weighting, and further, obtain a covariance matrix of the downlink channel according to the equivalent codebooks and the signal-to-noise ratios. Therefore, a covariance matrix of a downlink channel of user equipment can be obtained in multiple scenarios by using, the method in this application. Further, multiple types of signal processing may be performed subsequently according to the covariance matrix.

DESCRIPTION OF EMBODIMENTS

Figure 1:
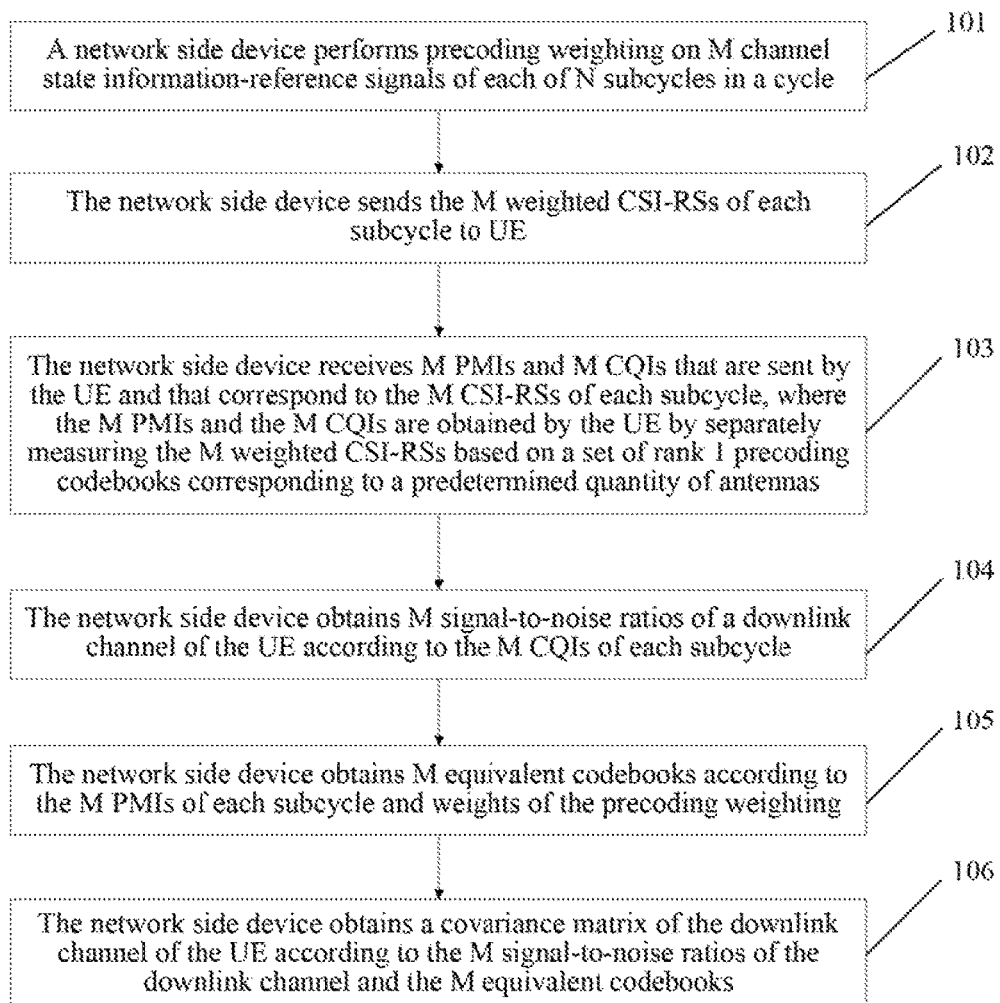
FIG. 1 is a flowchart of a method for obtaining downlink channel information according to an embodiment of this application.

Embodiments of this application provide a method and an apparatus for obtaining downlink channel information and a network side device, so as to resolve a technical problem in the prior art that a network side device cannot obtain downlink channel information of a user.

To make the objectives, technical solutions, and advantages of the embodiments of this application clearer, the following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

This specification describes various aspects with reference to user equipment and/or a network side device. The network side device is, for example, a base station.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station (for example, an access point) may refer to a device in communication with a wireless terminal via one or more sectors at an an interface on an access network. The base station may be configured to mutually convert a received over-the-air frame and an IP packet and serve as a router between the wireless terminal and a rest portion of the access network, where the rest portion of the access network may include an Internet protocol (IP) network. The base station may further coordinate attribute management of the air interface. For example, the base station may be a base station (BTS, Base Transceiver Station) in CDMA, may be a base station (NodeB) in WCDMA, or may further be an evolved NodeB (NodeB, eNB or e-NodeB, evolved Node B) in LTE, and this is not limited in this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Referring to FIG. 1, FIG. 1 is a flowchart of a method for obtaining downlink channel information according to an embodiment. Specifically, the method includes the following content:

Step 101: A network side device performs precoding weighting on M channel state information-reference signals (CSI-RS) of each of N sub-cycles in a cycle, where each sub-cycle is a quantity of measurement pilot subframes for bearing and transmitting the M CSI-RSs, N is a positive integer, and M is a quantity of CSI-RSs required by a predetermined antenna quantity.

Step 102: The network side device sends the M weighted CSI-RSs of each sub-cycle to UE.

Step 103: The network side device receives M precoding matrix indicators (PMI) and M channel quality indicators (CQI) that are sent by the UE and that correspond to the M CSI-RSs of each sub-cycle, where the M PMIs and the M CQIs are obtained by the UE by separately measuring the M weighted. CSI-RSs based on a set of rank 1 precoding codebooks corresponding to the predetermined antenna quantity.

Step 104: The network side device obtains M signal-to-noise ratios (SINR) of the downlink channel of the UE according t the M CQIs of each sub-cycle.

Step 105: The network side device obtains M equivalent codebooks according to the PMIs of each sub-cycle and weights of the precoding weighting.

Step 106: The network side device obtains, according to the M signal-to-noise ratios of the downlink channel and the M equivalent codebooks, a covariance matrix of the downlink channel of the UE as the downlink channel information.

In step 101, the network side device performs precoding weighting on M CSI-RSs of each sub-cycle in a cycle. Specifically, the weights of the preceding weighting may be a predetermined group of matrix codebooks, or may be randomly selected matrix codebooks. It should be noted that in whatever manner the Matrix codebooks of preceding weighting are selected, it needs to be ensured that a matrix T in the following formula (3) has full rank matrix.

Next, step 102 is performed, that is, the network side device sends the M weighted CSI-RSs of each sub-cycle to the UE. During actual application, the CSI-RSs may be borne on measurement pilot subframes. Each sub-cycle is a quantity of measurement pilot subframes for bearing and transmitting the M CSI-RSs. N is a positive integer, and M is a quantity of CSI-RSs required by a predetermined antenna quantity.

For example, if there are four transmit antennas, at least 16 signal-to-noise ratios (step 104) are needed to reconstruct a covariance matrix (step 106). Therefore, the network side device needs to send 16 successive CSI-RS subframes to the UE, so that the UE feeds back 16 CQIs to the network side device. Therefore, if there are four transmit antennas, 16 sets of CSI-RSs are needed. Assuming that one measurement pilot subframe may bear only one set of CSI-RSs, in one sub-cycle, 16 measurement pilot subframes need to be sent to the UE successively. Alternatively, one measurement pilot subframe may bear multiple sets of CSI-RSs with different configurations. Still using the example in which there are tour transmit antennas, assuming that each measurement pilot subframe bears four sets of CSI-RSs, in one sub-cycle, only four measurement pilot subframes need to be sent to the UE successively.

Further, when multiple sets of CSI-RSs with different configurations are delivered to the UE by using one measurement pilot: subframe, a CSI-RS transmission sub-cycle can be shortened. For example, the CSI-RS transmission sub-cycle in the foregoing example is reduced to ¼ of the original one. Therefore, a cycle of reconstructing a covariance matrix in step 106 can also be shortened, so that the reconstructed covariance matrix can better match actual channel changes.

Specifically, the predetermined antenna quantity may be a quantity of transmit antennas that the network side device actually has, or may be some of transmit antennas that the network side device actually has.

In step 102, after the network side device sends the M weighted. CSI-RSs of each sub-cycle to the UE, the LIE measures the received M weighted CSI-RSs based on a set of rank (RANK) 1 precoding codebooks corresponding to the predetermined antenna quantity, to obtain PMIs and CQIs that correspond to each CSI-RS. The set of rank 1 precoding codebooks corresponding to the predetermined antenna quantity may be specifically sent by the network side device to the UE, or may be specified in a protocol, or configured by a system. If the set of rank preceding codebooks is sent by the network side device, the network side device may specifically send the set of precoding codebooks by using radio resource control (RRC) signaling. For example, a set of rank 1 precoding codebooks corresponding to four transmit antennas includes 16 codebook matrices.

The UE measures each received CSI-RS during measurement. In this way, one PMI and one CQI corresponding to each CSI-RS are obtained. Because precoding codebook constraining is performed on the UE, matrix codebooks expressed by the PMIs that are obtained through measurement still belong to the set of precoding codebooks.

When the measurement is completed, the UE reports the PMIs and CQIs to the network side device. Correspondingly, the network side device performs step 103.

Next, step 104 is performed, that is, the network side device obtains M signal-to-noise ratios of a downlink channel of the UE according to the received M CQIs of each sub-cycle. Specifically, using an example in which N is 1. Assuming that there are four transmit antennas, the network side device receives 16 CQIs. If any CQI is referred to as $CQI_i$, a signal-to-noise ratio $\rho_i$ corresponding to $CQI_i$ is obtained by means of dequantization on $CQI_i$. In this way, 16 signal-to-noise ratios $\rho_i$ are obtained after step 104. If N is greater than or equal to 2, M signal-to-noise ratios $\rho_i$ of each sub-cycle are obtained.

Next, step 105 is described. The network side device obtains M equivalent codebooks according to the received M PMIs of each sub-cycle and weights of the precoding weighting. Specifically, using an example in which N is 1, assuming that there are four transmit antennas, the network side device receives 16 PMIs. Any PMI is referred to as $PMI_i$, an equivalent codebook $\overline{W}_i$ is obtained by multiplying a matrix codebook that corresponds to received $PMI_i$ by a weight of a CSI-RS that corresponds to $PMI_i$. If N is greater than or equal to 2, M equivalent codebooks $\overline{W}_i$ of each sub-cycle are obtained. However, because each sub-cycle has same M equivalent codebook only M equivalent codebooks $\overline{W}_i$ of one sub-cycle need to be reserved.

Next, step 106 is performed, that is, the network side device obtains, according to the M signal-to-noise ratios of the downlink channel and the M equivalent codebooks, a covariance matrix of the downlink channel of the UE as the downlink channel information. To enable a person skilled in the art understand the solution in this embodiment, the following first describes an implementation principle of the solution in this embodiment.

When N is equal to 1, formula (1) is established with the constraint of rank 1 precoding codebooks corresponding to the predetermined antenna quantity:

$$\frac{\overline{W}_i^H R \overline{W}_i}{\sigma^2} = \rho_i \qquad (1)$$

where $\overline{W}_i$ represents an equivalent codebook, R represents a covariance matrix of a downlink channel, $\sigma^2$ represents a noise power of the downlink channel, and H represents a channel matrix.

If there, are four transmit antennas, equivalent codebooks are recorded as $$\overline{W}_i = \begin{bmatrix} w_{i0} \\ w_{i1} \\ w_{i2} \\ w_{i3} \end{bmatrix},$$

and a covariance matrix is $$R = \begin{bmatrix} x_0 & x_1 + jx_2 & x_3 + jx_4 & x_5 + jx_6 \\ x_1 - jx_2 & x_7 & x_8 + jx_9 & x_{10} + jx_{11} \\ x_3 - jx_4 & x_8 + jx_9 & x_{12} & x_{13} + jx_{14} \\ x_5 - jx_6 & x_{10} - jx_{11} & x_{13} - jx_{14} & x_{15} \end{bmatrix},$$

where j is an imaginary unit; in this case, formula (1) can be transformed into formula (2):

$$\frac{\overline{W}_i^H R \overline{W}_i}{\sigma^2} = \frac{1}{\sigma^2} \begin{bmatrix} |w_{i0}|^2 \\ 2*real(w_{i0}^H w_{i1}) \\ -2*imag(w_{i0}^H w_{i1}) \\ 2*real(w_{i0}^H w_{i2}) \\ -2*imag(w_{i0}^H w_{i2}) \\ 2*real(w_{i0}^H w_{i3}) \\ -2*imag(w_{i0}^H w_{i3}) \\ |w_{i1}|^2 \\ 2*real(w_{i1}^H w_{i2}) \\ -2*imag(w_{i1}^H w_{i2}) \\ 2*real(w_{i1}^H w_{i3}) \\ -2*imag(w_{i1}^H w_{i3}) \\ |w_{i2}|^2 \\ 2*real(w_{i2}^H w_{i3}) \\ -2*imag(w_{i2}^H w_{i3}) \\ |w_{i3}|^2 \end{bmatrix}^T \begin{bmatrix} x_0 \\ x_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \end{bmatrix} = T_i \begin{bmatrix} x_0 \\ x_1 \\ x_2 \\ x_3 \\ x_4 \\ x_5 \\ x_6 \\ x_7 \\ x_8 \\ x_9 \\ x_{10} \\ x_{11} \\ x_{12} \\ x_{13} \\ x_{14} \\ x_{15} \end{bmatrix} = \rho_i \quad (2)$$

where in formula (2), T represents matrix transposition. After one sub-cycle, formula (3) is, established:

$$\frac{1}{\sigma^2} \begin{bmatrix} \overline{W}_0^H R \overline{W}_0 \\ \vdots \\ \overline{W}_{15}^H R \overline{W}_{15} \end{bmatrix} = \begin{bmatrix} T_0 \\ \vdots \\ T_{15} \end{bmatrix} \begin{bmatrix} x_0 \\ \vdots \\ x_{15} \end{bmatrix} = TX = \begin{bmatrix} \rho_0 \\ \vdots \\ \rho_{15} \end{bmatrix} \quad (3)$$

$\sigma^2$ represents, a noise power of the downlink channel and is an approximately constant value, and therefore does not affect directivity of the covariance matrix, Therefore, $\sigma^2$ is directly ignored in derivation of formula (3).

Because the matrix T has full rank, that the matrix T has rank 16, formula (4) can be derived from formula (3):

$$X = \begin{bmatrix} x_0 \\ \vdots \\ x_{15} \end{bmatrix} = T^{-1} \begin{bmatrix} \rho_0 \\ \vdots \\ \rho_{15} \end{bmatrix} \quad (4)$$

Therefore, after 16 signal-to-noise ratios $\rho_0$ to $\rho_{15}$ are obtained in step 104 and equivalent codebooks $\overline{W}_0, \ldots, \overline{W}_{15}$ are obtained in step 105, $x_0$ to $x_{15}$ can be obtained through calculation in step 106 according to formula (4), to obtain a covariance matrix R.

When N is greater than or equal to 2, N groups of signal-to-noise ratios $\rho_0$ to $\rho_{15}$ and N groups of equivalent codebooks $\overline{W}_i$ are obtained, where the N groups of equivalent codebooks are the same. Next, signal-to-noise ratios $\rho_0$ of all the groups are averaged, signal-to-noise ratios $\rho_1$ of all the groups are averaged, and so on, till signal-to-noise ratios p of all the groups are averaged. In this way, 16 average signal-to-noise ratios are obtained. Then, a covariance matrix of a cycle consisting of N sub-cycles can he obtained according to the 16 average signal-to-noise ratios and 16 equivalent codebooks.

As can be seen, in this embodiment of this application, preceding weighting is It) performed on CSI-RSs sent by a network side device to UE, and the UE measures the CSI-RSs based on a set of rank 1 codebooks corresponding to a predetermined antenna quantity, that is, codebooks are constrained. Therefore, PMIs obtained by means of measurement are also codebook-constrained. With the constraint of rank 1 codebooks, the network side device can calculate signal-to-noise ratios of a downlink channel of the UE according to CQIs, obtain equivalent codebooks according to the PMIs measured by the UE and weights of the precoding weighting, and further, obtain a covariance matrix of the downlink channel according to the equivalent codebooks and the signal-to-noise ratios. Therefore, a covariance matrix of a downlink channel of user equipment can be obtained in multiple scenarios by using the method in this application. Further, the network side device may perform date processing in another aspect according to the reconstructed covariance matrix, for example, BF weighting, or user pairing. This is not limited in this application.

Optionally, to reduce deviation of the signal-to-noise ratios that is resulted from CQI quantization, where the signal-to-noise ratios are obtained according to the CQIs, and improve accuracy of the reconstructed covariance matrix, if N is greater than or equal to 2, before step 102, the method further includes weighting the M CSI-RSs of each sub-cycle by using a power control factor that corresponds to each sub-cycle. Specifically, in addition to the preceding weighting on the CSI-RSs to be sent to the UE, the CSI-RSs further need to be multiplied by the power control factor Optionally, the sub-cycles correspond to different power control factors. In this case, the M weighted CSI-RSs in step 102 are the M CSI-RSs on which both precoding weighting and power-control-factor weighting are performed.

In this case, step 104 includes: obtaining, according to the M CQIs of each sub-cycle and the power control factor used in each sub-cycle, the M signal-to-noise ratios of the downlink channel that correspond to each sub-cycle and obtaining an average signal-to-noise ratio of all of the M signal-to-noise ratios of the downlink channel that correspond to each sub-cycle, and using average signal-to-noise ratios as the M signal-to-noise ratios of the downlink channel of the UE.

For example, assuming that N is equal to 3, the cycle in, step 101 includes a sub-cycle $T_0$, a sub-cycle $T_1$, and a sub-cycle $T_2$. In the sub-cycle $T_0$, a power control factor is $\lambda_0$. In the sub-cycle $T_1$, a power control factor is $\lambda_1$. In the sub-cycle $T_2$, a power control factor is $\lambda_2$. Similarly, an example in which there are four transmit antennas is used. In sub-cycle $T_0$, when receiving $CQI^0_i$ fed back by the UE, the network side device performs dequantization processing on $CQI^0_i$ to obtain a signal-to-noise ratio $\rho^0_i$ of the downlink channel. The value of i ranges from 0 to 15, where the superscript 0 represents the sub-cycle $T_0$. Then, the power control factor $\lambda_0$ is divided by $\rho^0_i$ to obtain a real signal-to-noise ratio $$\frac{\rho^0_i}{\lambda_0}.$$

In this way, 16 real signal-to-noise ratios in the sub-cycle $T_0$ are obtained. $CQI^1_i$ in the sub-cycle $T_1$ are processed by using the same method to obtain a real signal-to-noise ratio $$\frac{\rho^2_i}{\lambda_1},$$

where the superscript 1 represents the sub-cycle $T_1$. Similarly $CQI^2_i$ in the sub-cycle $T_2$ is processed to obtain a real signal-to-noise ratio $$\frac{\rho^2_i}{\lambda_2},$$

where the superscript 2 represents the sub-cycle $T_2$. In this way, 16 real signal-to-noise ratios that correspond to each sub-cycle are obtained.

Then, an average signal-to-noise ratio of all of the 16 signal-to-noise ratios of the downlink channel that correspond to each sub-cycle is obtained, and average signal-to-noise ratios are used as 16 signal-to-noise ratios of the downlink channel of the UE. Specifically, in a big cycle consisting of $T_0+T_1+T_2$, an $i_{th}$ signal-to-noise ratio $\rho_i$ is $$\left(\frac{\rho^0_i}{\lambda_0} + \frac{\rho^1_i}{\lambda_1} + \frac{\rho^2_i}{\lambda_2}\right)/3.$$

Further, step 103 is slightly different according to different use scenarios, that is, a manner of feeding back CQIs by the UE to the network side device is slightly different. Specifically, in an LOS single-path or small-delay-spread scenario, channel fading is relatively flat, and channel responses experienced by different subcarriers on a frequency domain are generally the same. When measuring CQIs, the UE side may perform full-band CQI reporting by using a physical uplink control channel (PUCCH). In this way, the signal-to-noise ratios reconstructed in step 104 are full-bandwidth signal-to-noise ratios, and the covariance matrix reconstructed in step 106 is a full-bandwidth covariance matrix. In an NLOS multi-path delay-spread scenario, however, frequency selective fading of a channel is relatively severe, channel responses experienced by subcarriers on a frequency domain have relatively great differences. Therefore, the UE needs to feed back CQIs of each subband to the network side device. Due to a large amount of feedback information, channel associated feedback may be performed by using a physical uplink shared channel (PUSCH). Correspondingly the network side device receives M CQIs of each subband of each sub-cycle. Therefore, in step 104, signal-to-noise ratios of each subband can be obtained by using CQIs of each subband, and in step 106, covariance matrix of each subband of the downlink channel can be obtained according to the signal-to-noise ratios of each subband and the equivalent codebooks.

Further, as described above, after obtaining the covariance matrix of the downlink channel of the UE in step 106, the covariance matrix may have multiple purposes, for example, performing UE weighting downlink data sent to the UE. A possible implementation manner of weighting the downlink data by using the covariance matrix is selecting an eigenvector that corresponds to a maximum eigenvalue of the covariance matrix as a weight. In this way, when the network side device sends downlink data to target UE, a main lobe direction of an antenna directivity pattern is aligned with the target UE, and a null point is aligned with an interference direction, so that interference can be effectively suppressed, improving signal-to-noise ratios of the target UE. After the interference is suppressed, the network side device may instruct, by using a physical downlink control channel, each UE to occupy a same time-frequency resource, to implement time-frequency resource multiplexing by multiple users and improve system capacity. When the network side device has four transmit antennas, multiplexing by a maximum of four users can be implemented, or single-user dual-stream may be implemented.

During actual application, the downlink data may be weighted by using the covariance matrix in another implementation manner, for example, zero forcing. A person skilled in the art is familiar with this part of content, which is not described herein.

The following describes, by using sonic specific examples, a specific implementation process of performing BF weighting by using a covariance matrix.

A first example is a 2R-terminal scenario, that is, a 4×2 MIMO scenario in which a network side device has four transmit antennas, and UE has two receive antennas. In a demodulation reference signal (DMRS)-based transmission mode (TM) 8/9, single-user dual-stream, two-layer SU-MIMO BF system, each codeword is mapped to one layer, and two codewords are transmitted on a same time-frequency resource. BF weighting is one of processes of downlink transmission.

To perform BF weighting, BF weights need to be calculated. The BF weights are obtained through calculation by using a covariance matrix R of a downlink channel. The covariance matrix R is specifically obtained by using, for example, the method described above, and a method for calculating the weights is one of the methods described above. Because a CQI feedback manner in a multi-path small delay scenario is different from that in a multi-path great-delay-spread scenario, reconstructed R is full-band R or subband R, and calculation methods of BF weights are different correspondingly.

Figure 2:
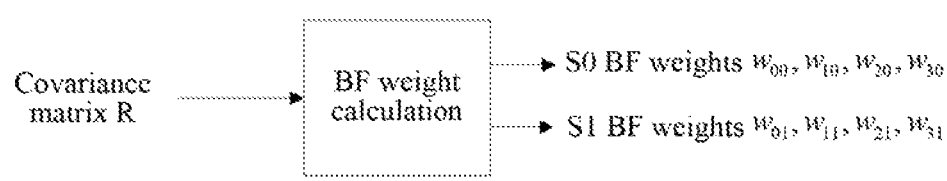
FIG. 2 is a schematic diagram of calculating a BF weight in a single-user dual-stream small-delay scenario according to an embodiment of this application.

As shown in FIG. 2, assuming that a network side device needs to send two codewords, S0 and S1, to UE, weights $W_{10}$ and $W_{11}$ of each antenna that correspond to the two codewords need to be calculated. Because there are four transmit antennas herein, the value of i ranges from 0 to 3. Weights of each antenna are obtained through calculation by using R. It is assumed that BF weights corresponding to the codeword S0 are respectively $w_{00}$, $w_{10}$, $w_{20}$, $w_{30}$, and BF weights corresponding to the codeword S1 are respectively $w_{01}$, $w_{11}$, $w_{21}$, $w_{31}$.

Figure 3:
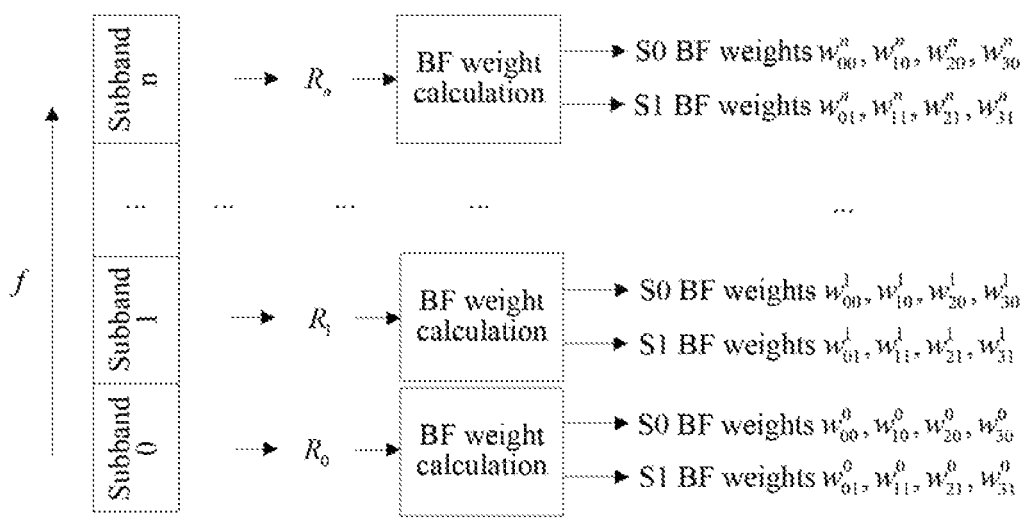
FIG. 3 is a schematic diagram of calculating a BF weight in a single-user dual-stream great-delay scenario according to an embodiment of this application.

As shown in FIG. 3, in a multi-path great-delay-spread scenario, BF weights of each subband need to be obtained through calculation according to a channel covariance matrix R of each subband. Assuming that covariance matrices of the subbands obtained through calculation in step 106 are $R_0$ to $R_n$, and BF weights are $W^0_{i0}$ to $W^n_{in}$. The value of i ranges from 0 to 3, n is an integer greater than or equal to 2, and f represents a frequency domain.

Further, continuing to refer to FIG. 3, on a subband 1, BF weights corresponding to a codeword 0 are $w_{00}^0, w_{10}^0, w_{20}^0, w_{30}^0$, and BF weights corresponding to a codeword 1 are $w_{01}^0, w_{11}^0, w_{21}^0, w_{31}^0$. By analogy, on a subband n, BF weights corresponding to a codeword 0 are $w_{00}^n, w_{10}^n, w_{20}^n, w_{30}^n$, and BF weights corresponding to a codeword 1 are $w_{00}^n, w_{10}^n, w_{20}^n, w_{30}^n$.

Figure 4:
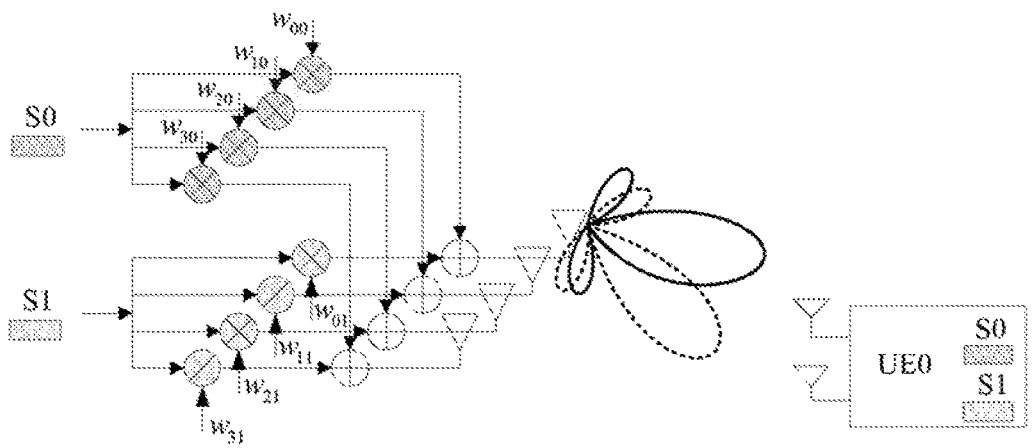
FIG. 4 is a schematic diagram of BF weighted transmission in a single-user dual-stream small-delay scenario according to an embodiment of this application.

After the BF weights are obtained through calculation, BF weighted transmission is performed. As shown in FIG. 4, FIG. 4 is a schematic diagram of BF weighted transmission of codewords S0 and S1 in a small-delay scenario. The codeword S0 is weighted by using the four BF weights $W_{00}, W_{10}, W_{20}, W_{30}$, the codeword S1 is weighted by using the four BF weights $W_{01}, W_{11}, W_{21}, W_{31}$, and four weighted values of the codeword S0 are respectively added with four weighted values of the codeword S1, to obtain four values that are respectively sent on four physical antennas. In FIG. 4, a main lobe (solid line) of an antenna pattern of a network side device is aligned with one receive antenna of user equipment UE0, and a main lobe (dashed line) of the antenna pattern of the network side device is aligned with another receive antenna of UE0. UE0 receives the codeword S0 and the codeword S1 by using the two receive antennas respectively.

For a multi-path great-delay-spread scenario, a BF weighting method of each subband is the same as that in the small-delay scenario, and details are not described herein again.

A second example is a four-transmit antenna and multi-user pairing scenario, which may be divided into the following sub-scenarios according to different quantities of users to be paired, different quantities of codewords, and different quantities of layers to which each codeword is mapped.

A first sub-scenario is a two-user pairing scenario, for example, UE0-UE1 pairing. In this case, pairing may be performed based on whether PMIs (obtained in step 103) of the two users are orthogonal or quasi-orthogonal. Alternatively, the pairing may be performed based on a correlation threshold of an eigen vector of the covariance matrix obtained in step 106. Alternatively, the pairing may be performed based on scheduling priorities of the users. Alternatively, the users to be paired may be selected based on a BF capacity maximization criterion. Certainly, during actual application, the user pairing may be performed by using another algorithm. A person skilled in the art is familiar with this part of content, and details are not described herein. There are six types of two-user pairing scenarios. A first type is a two-layer MU-MIMO scenario in which UE0 has a single codeword that is mapped to one layer, and UE1 has a single codeword that is mapped to one layer. A second type is a three-layer MU-MIMO scenario in which UE0 has a single codeword that is mapped to two layers, and UE1 has a single codeword that is mapped to one layer. A third type is a four-layer MU-MIMO scenario in which UE0 has a single codeword that is mapped to two layers, and UE1 has a single codeword that is mapped to two layers. A fourth type is a three-layer MU-MIMO scenario in which UE0 has a single codeword that is mapped to one layer, and UE1 has two codewords that are mapped to one layer each. A fifth type is a four-layer MU-MIMO scenario in which UE0 has a single codeword that is mapped to two layers, and UE1 has two codewords that are mapped to one layer each. A sixth type is a four-layer MU-MIMO scenario in which UE0 has two codewords that are mapped to one layer each, and UE1 has two codewords that are mapped to one layer each.

A next sub-scenario is a three-user scenario, for example, paring is performed among UE0, UE1 and UE2. In this case, the pairing may be performed based on a correlation threshold of are eigenvector of the covariance matrix obtained in step 106. Alternatively, the pairing may be performed based on scheduling priorities of the users. Alternatively, the users to be paired may be selected based on a BF capacity maximization criterion. Certainly, during actual application, the user pairing may be performed by using another algorithm. A person skilled in the art is familiar with this part of content, and details are not described herein.

Based on whichever paring method, there are the following three types of three-user pairing scenarios. A first type is a three-layer MU-MIMO scenario in which UE0 has a single codeword that is mapped to one layer, UE1 has a single codeword that is mapped to one layer, and UE2 has a single codeword that is mapped to one layer. A second type is a four-layer MU-MIMO scenario in which UE0 has a single codeword that is mapped to two layers, UE1 has a single codeword that is mapped to one layer, and UE2 has a single codeword that is mapped to one A third type is a four-layer MU-MIMO scenario UE0 has two codewords that are mapped to one layer each, UE1 has a single codeword that is mapped to one layer, and UE2 has a single codeword that is mapped to one layer.

A next sub-scenario is a four-user paring scenario. For example, pairing is performed among UF0, UE1, UE2, and UE3. In this case, there is only one paring method, that is, each user has a single codeword that is mapped to one layer, and this is a four-layer MU-MIMO scenario, The following uses a four-layer MU-MIMO scenario as an example, in which there are two users to be paired, each user has two codewords, and each codeword is mapped to one layer, to describe BF weight calculation and BF weighted transmission in this scenario.

Figure 5:
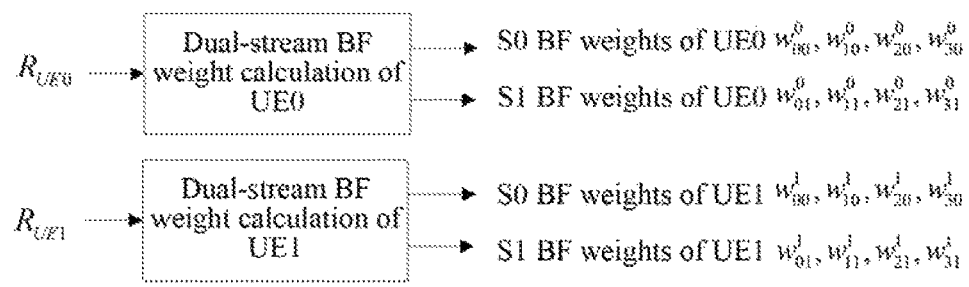
FIG. 5 is a schematic diagram of calculating a BF weight in a multi-user small-delay scenario according to an embodiment of this application.

As shown in FIG. 5, FIG. 5 is a schematic diagram of calculating full-band BF weights of each codeword of each user on each antenna in a small-delay-spread scenario. First, a covariance matrix $R_{UE0}$ of a downlink channel of a user UE0 and a covariance matrix $R_{UE1}$ of a downlink channel of a user UE1 are obtained according to FIG. 1 and the method described in the embodiment of FIG. 1. In a small-delay-spread scenario, both the covariance matrix $R_{UE0}$ and the covariance matrix $R_{UE1}$ are full-bandwidth covariance matrices. Four BF weights of two codewords of UE0 are $W_{ij}^0$ (i=0, . . . ,3, j=0,1), and four BF weights of two codewords of UE1 are $W_{ij}^1$ (i=0, . . . ,3, j=0,1).

Figure 6:
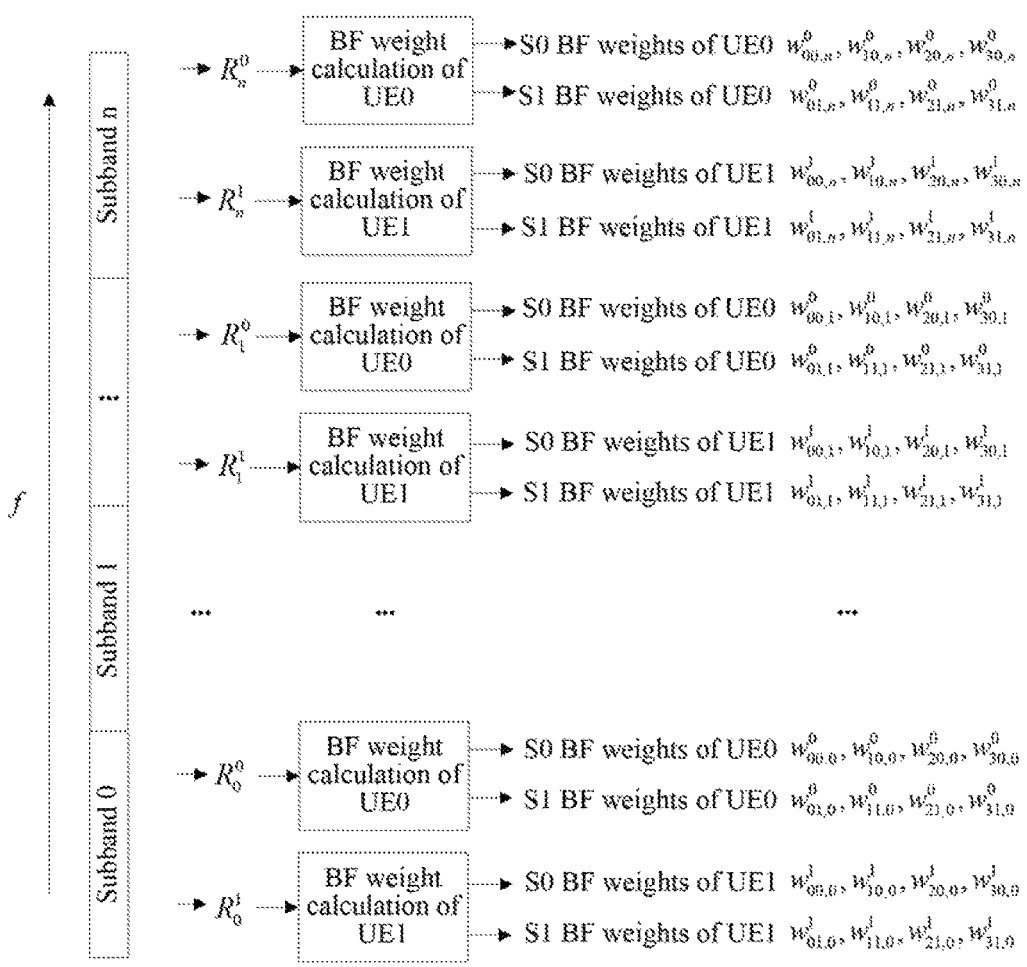
FIG. 6 is a schematic diagram of calculating a BF weight in a multi-user great-delay scenario according to an embodiment of this application.

As shown in FIG. 6, FIG. 6 is a schematic diagram of calculating subband BF weights of each codeword of each user on each antenna in a great-delay-spread scenario. First, covariance matrices $R_0^0$ to $R_n^0$ of a downlink channel of a user. UE0 are obtained according to FIG. 1 and the method described in the embodiment of FIG. 1, and BF weights are $W_{i0n}^0$ to $W_{i1n}^0$ respectively Covariance matrices of a downlink channel of a user UE1 are $R_0^1$ to $R_n^1$, and BF weights are $W_{i0n}^1$ to $W_{i1n}^1$ respectively. The value of i ranges from 0 to 3, and n is an integer greater than or equal to 2.

Figure 7:
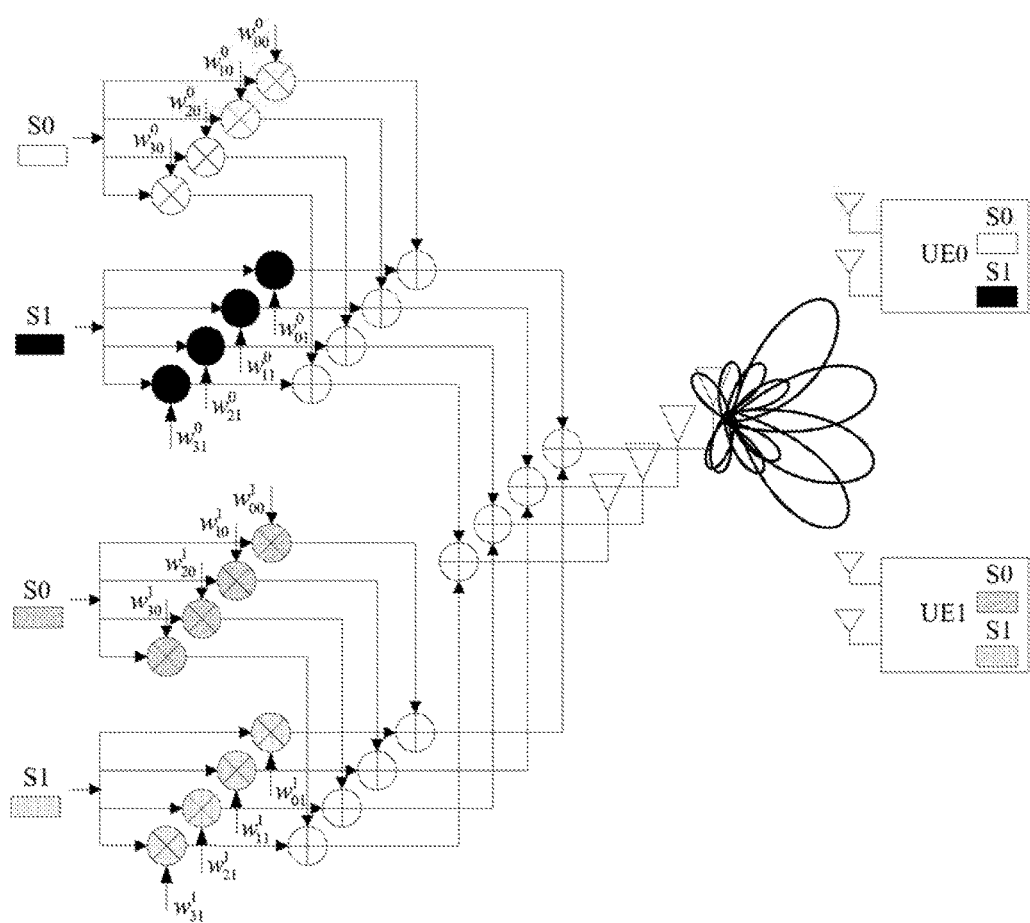
FIG. 7 is a schematic diagram of BF weighted transmission in a multi-user small-delay scenario according to an embodiment of this application.

As shown in FIG. 7, FIG. 7 shows that in a small-delay-spread scenario, two codewords of UE0 are separately weighted by using four BF weights $W_{ij}^0$ and added together, two codewords of UE1 are separately weighted by using four BF weights $W_{ij}^1$, and added together, and then four values of UE1 and thur values of UE2 are added respectively, to be sent on four physical antennas. Main lobes of an antenna pattern of a network side device are respectively aligned with four receive antennas of the two users. UE0 receives, by separately using two receive antennas, codeword S0 and codeword S1 sent to UE0. UE1 receives, by separately using two receive antennas, codeword S0 and codeword S1 sent to UE1.

For a multi-path great-delay-spread scenario, BF weighted transmission of each subband is the same as that in a small-delay-spread scenario, and is not described herein again.

A third example is a 4R terminal scenario, that is, UE has four receive antennas. If a network side device also has four transmit antennas, the 4R terminal can support, in addition to the various scenarios described in the first example and the second example, a single-user dual-stream, or a three-layer/four-layer single-user dual-stream BF system (where one codeword is mapped to two layers and the other codeword is mapped to one layer, or two codewords are mapped to two layers each). Further, two-user pairing may be supported, where a single stream of one user is mapped to three layers, and a single stream of the other user is mapped to one layer. A transmission procedure of the 4R terminal is similar to that of a 2R terminal, and is not described herein.

In a fourth example, in this embodiment, a network side device has eight transmit antennas. When cooperative transmission is performed by using all the antennas, whether a BF system is a single-user dual-stream BF system or a multi-user BF system, a procedure is similar to that in a four-transmit-antenna scenario. What is different is that a minimum cycle is prolonged when there are eight transmit antennas. For example, 16 successive measurement pilot subframes need to be sent in a minimum cycle when there are four transmit antennas: however, the minimum cycle becomes 64 successive measurement pilot subframes when there are eight transmit antennas. However, a transmission cycle may also be shortened in the foregoing manner in which one measurement pilot subframe bears multiple sets of CSI-RSs. In addition, matrix codebooks used for performing precoding weighting on CSI-RSs are different from those in a four-transmit-antenna scenario. If there are eight transmit antennas, precoding weighting is performed based on two codebooks. Finally, a set of precoding codebooks changes because the predetermined antenna quantity changes, and codebook constraining is performed on UE by a higher layer.

In an eight-transmit-antenna scenario, when cooperative transmission is performed by using some antennas, for example, when UE is served by an antenna 0 to an antenna 3 only, BF weighted downlink transmission may be implemented by obtaining downlink channel information of the antenna 0 to the antenna 3 only. This can not only greatly reduce calculation complexity of reconstructing downlink channel information, but also can greatly shorten a transmission cycle of measurement pilot subframes.

Based on a same invention concept, an embodiment in this application further provides an apparatus for obtaining downlink channel information. Refer to FIG. 1 to FIG. 7 and related descriptions of embodiments for meanings and specific implementations of terms involved in the apparatus shown in FIG. 8.

Figure 8:
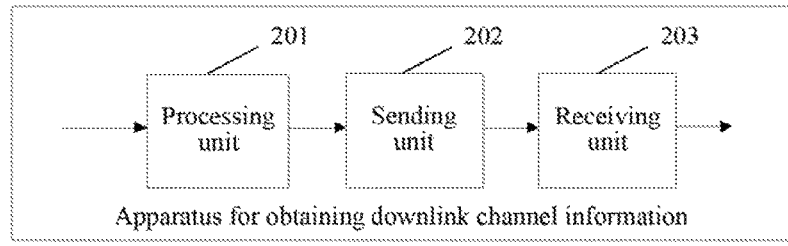
FIG. 8 is a function block diagram of an apparatus for obtaining downlink channel information according to an embodiment of this application.

As shown in FIG. 8, the apparatus includes: a processing unit 201, configured to perform precoding, weighting on M channel state information-reference signals CSI-RSs of each of N sub-cycles in a cycle, where each sub-cycle is a quantity of measurement pilot subframes for bearing and transmitting the M CSI-RSs, N is a positive integer, and M is a quantity of CSI-RSs required by a predetermined antenna quantity; a sending unit 202, configured to send the M weighted CSI-RSs of each sub-cycle to user equipment UE; a receiving unit 203, configured to receive M precoding matrix indicators PMIs and M channel quality indicators CQIs that are sent by the UE and that correspond to the M CSI-RSs of each sub-cycle, where the M PMIs and the M CQIs are obtained by the UE by separately measuring the M weighted CSI-RSs based on a set of rank 1 precoding codebooks corresponding to the predetermined antenna quantity. The processing unit 201 is further configured to: obtain M signal-to-noise ratios of a downlink channel of the UE according to the M CQIs of each sub-cycle; obtain M equivalent codebooks according to the M PMIs of each sub-cycle and weights of the precoding weighting; and obtain, according to the M signal-to-noise ratios of the downlink channel and the M equivalent codebooks, a covariance matrix of the downlink channel of the UE as the downlink channel information.

Further, the sending unit 202 is further configured to: before the receiving unit 203 receives the M PMIs and the M CQIs that are sent by the UE and that correspond to the M CSI-RSs of each sub-cycle, send the set of rank 1 precoding codebooks corresponding to the predetermined antenna quantity to the UE.

Optionally, when N is greater than or equal to 2, before the sending unit 202 sends the M weighted CSI-RSs of each sub-cycle to the user equipment UE, the processing unit 201 is further configured to: weight the M CSI-RSs of each sub-cycle by using a power control factor that corresponds to each sub-cycle; obtain, according to the M CQIs of each sub-cycle and the power control factor used in each sub-cycle, the M signal-to-noise ratios of the downlink channel that correspond to each sub-cycle; and obtain an average signal-to-noise ratio of all of the M signal-to-noise ratios of the downlink channel that correspond to each sub-cycle, where the average signal-to-noise ratios are used as the M signal-to-noise ratios of the downlink channel of the UE.

With reference to the foregoing embodiments, the processing unit 201 is further configured to perform beamforming weighting processing on downlink data of the UE according to the covariance matrix.

With reference to the foregoing embodiments, the apparatus may be, for example, a base station.

Variations of the method for obtaining downlink channel information and specific examples in the embodiment of FIG. 1 are also applicable to the apparatus far obtaining downlink channel information in this embodiment. A person skilled in the art may clearly understand, according to the foregoing detailed descriptions of the method for obtaining downlink channel information, an implementation method of the apparatus for obtaining downlink channel information in this embodiment. Details are not described herein again for brevity of this specification.

Based on a same invention concept, an embodiment further provides a network side device. Refer to FIG. 1 to FIG. 7 and related descriptions of embodiments for meanings and specific implementations of terms involved in the network side device shown in FIG. 9.

Figure 9:
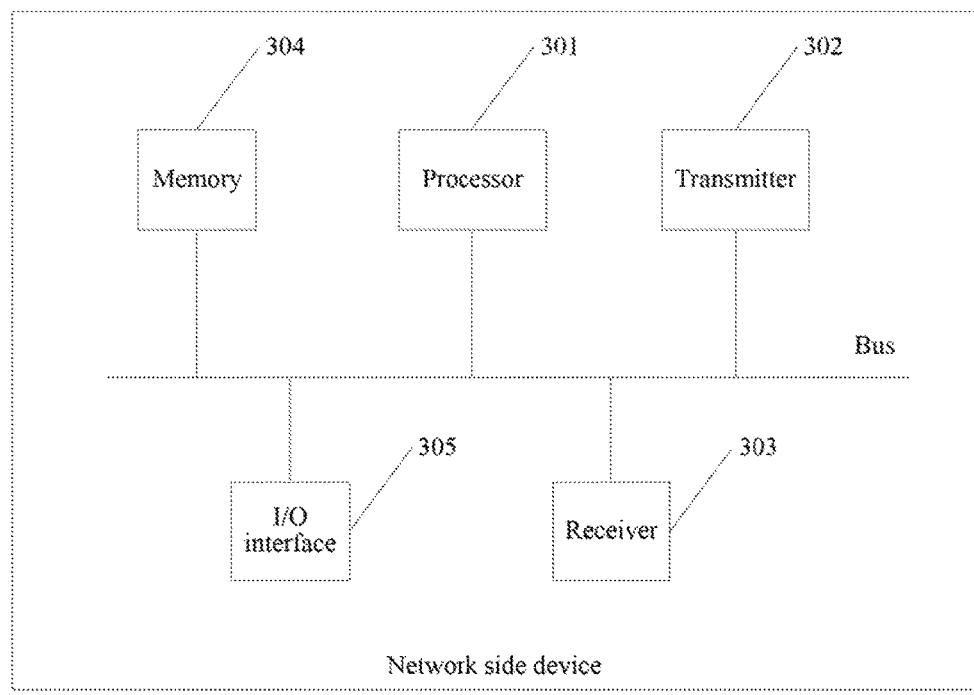
FIG. 9 is a systematic structural diagram of a network side device according to an embodiment of this application.

As shown in FIG. 9. FIG. 9 is a systematic structural diagram of the network side device in this embodiment. The network side device includes: a processor 301, transmitter 302, a receiver 303, a memory 304, and an input/output (I/O) interface 305. The processor 301 may be specifically a general-purpose central processing unit (CPU), or an application-specific integrated circuit (ASIC), or one or more integrated circuits for controlling execution of a program. The I/O interface 305 may be connected to a keyboard, a mouse, a touchscreen device, a voice activity input module, a display, a camera, or the like. There may be one or more memories 304. The memory 304 may include a read-only memory (ROM), a random access memory (RAM), and a magnetic disk memory. These memories, the receiver 303, and the transmitter 302 are connected to the processor 301 by using a bus. The receiver 303 and the transmitter 302 are configured to perform network communication with an external device, and may specifically perform network communication with an external device by using a network such as Ethernet, a radio access network, or a wireless local area network. The receiver 303 and the transmitter 302 may be two physically separate elements, or a physically same element.

The memory 304 may store instructions, and the processor 301 may perform instructions stored in the memory 304.

Specifically, the processor 301 is configured to perform precoding weighting on M channel state information-reference signals CSI-RSs of each of N sub-cycles in a cycle, where each sub-cycle is a quantity of measurement pilot subframes for bearing and transmitting the M N is a positive integer, and M is a quantity of CSI-RSs required by a predetermined antenna quantity; the transmitter 302 is configured to send the M weighted CSI-RSs of each sub-cycle to user equipment UE; the receiver 303 is configured to receive M precoding matrix indicators PMIs and M channel quality indicators CQIs that are sent by the UE and that correspond to the M CSI-RSs of each sub-cycle, where the M PMIs and the M CQIs are obtained by the UE by separately measuring the M weighted CSI-RSs based on a set, of rank 1 precoding codebooks corresponding to the predetermined antenna quantity. The processor 301 is further configured to: obtain M signal-to-noise ratios of a downlink channel of the UE according to the M CQIs of each sub-cycle; obtain M equivalent codebooks according to the M PMIs of each sub-cycle and weights of the precoding weighting; and obtain a covariance matrix or the downlink channel of the UE according to the M signal-to-noise ratios of the downlink channel and the M equivalent codebooks.

Further, the transmitter 302 is further configured to: before the receiver 303 receives the M preceding matrix indicators PMIs and the M channel quality indicators CQIs that are sent by the UE and that correspond to the M CSI-RSs of each sub-cycle, send the set of rank 1 precoding codebooks corresponding to the predetermined antenna quantity to the UE.

Optionally, when N is greater than or equal to 2, the processor 301 is further configured to: before the transmitter 302 sends the M weighted CSI-RSs of each sub-cycle to the user equipment UE, weight the M CSI-RSs of each sub-cycle by using a power control factor that corresponds to each sub-cycle: obtain, according to the M CQIs of each sub-cycle and the power control factor used in each sub-cycle, the M signal-to-noise ratios of the downlink channel that correspond to each sub-cycle, and obtain an average signal-to-noise ratio of all of the M signal-to-noise ratios of the downlink channel that correspond to each sub-cycle, and use the average signal-to-noise ratios as the M signal-to-noise ratios of the downlink channel of the UE.

With reference to the foregoing embodiments, the processor 301 is further configured to perform beamforming weighting processing on downlink data of the UE according to the covariance matrix.

The network side device in this embodiment may be, for example, a base station.

Variations of the method for obtaining downlink channel information and specific examples in the embodiment of FIG. 1 are also applicable to the network side device in this embodiment. A person skilled in the art may clearly understand, according to the foregoing detailed descriptions of the method for obtaining downlink channel information, an implementation manner of the network side device in this embodiment, and details are not described herein again for brevity of this specification.

One or more technical solutions according to the embodiments of this application have at least the following technical effects or advantages.

In the embodiments of this application, precoding weighting is performed on CSI-RSs sent by a network side device to UE, and the UE measures the CSI-RSs based on a set of rank 1 codebooks corresponding to a predetermined antenna quantity, that is, codebooks are constrained. Therefore, PMIs obtained by means of measurement are also codebook-constrained. With the constraint of rank 1 codebooks, the network side device can calculate signal-to-noise ratios of a downlink channel of the UE according to CQIs, obtain equivalent codebooks according to the PMIs measured by the UE and weights of the precoding weighting, and further, obtain a covariance matrix of the downlink channel according to the equivalent codebooks and the signal-to-noise ratios. Therefore, a covariance matrix of a downlink channel of user equipment can be obtained in multiple scenarios by using the method in this application. Further, multiple types of signal processing may be performed subsequently according to the covariance matrix.

A person skilled in the art should understand that the embodiments of this application may be provided as a method, a system, or a computer program product. Therefore, this application may use a form of hardware only embodiments, software only embodiments, or, embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may he provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art may make various modifications and variations to this application without departing from the spirit and scope of this application. This application is intended to cover these modifications and variations of this application provided that they fall within the scope of protection defined by the following claims and their equivalent technologies.

What is claimed is:

1. A method for obtaining downlink channel information, comprising:
    performing, by a network side device, precoding weighting on M channel state information-reference signals (CSI-RSs) of each of N sub-cycles in a cycle, wherein each sub-cycle is a quantity of measurement pilot subframes for bearing and transmitting the M CSI-RSs, N is a positive integer, and M is a quantity of CSI-RSs required by a predetermined antenna quantity;
    sending, by the network side device, the M weighted CSI-RSs of each sub-cycle to user equipment (UE);
    receiving, by the network side device, M precoding matrix indicators (PMIs) and M channel quality indicators (CQIs) that are sent by the UE and that correspond to the M CSI-RSs of each sub-cycle, wherein the M PMIs and the M CQIs are obtained by the UE by separately measuring the M weighted CSI-RSs based on a set of rank 1 precoding codebooks corresponding to the predetermined antenna quantity;
    obtaining, by the network side device, M signal-to-noise ratios of a downlink channel of the UE according to the M CQIs of each sub-cycle;
    obtaining, by the network side device, M equivalent codebooks according to the M PMIs of each sub-cycle and weights of the precoding weighting; and
    obtaining, by the network side device, according to the M signal-to-noise ratios of the downlink channel and the M equivalent codebooks, a covariance matrix of the downlink channel of the UE as the downlink channel information.

2. The method according to claim 1, wherein before the receiving, by the network side device, M precoding matrix indicators (PMIs) and M channel quality indicators (CQIs) that are sent by the UE and that correspond to the M CSI-RSs of each sub-cycle, the method further comprises:
    sending, by the network side device, the set of rank 1 precoding codebooks corresponding to the predetermined antenna quantity to the UE.

3. The method according to claim 1, wherein if N is greater than or equal to 2, before the sending, by the network side device, the M weighted CSI-RSs of each sub-cycle to user equipment (UE), the method further comprises:
    weighting, by the network side device, the M CSI-RSs of each sub-cycle by using a power control factor that corresponds to each sub-cycle; and
    the obtaining, by the network side device, M signal-to-noise ratios of a downlink channel of the UE according to the M CQis of each sub-cycle comprises:
        obtaining, according to the M CQIs of each sub-cycle and the power control factor used in each sub-cycle, the M signal-to-noise ratios of the downlink channel that correspond to each sub-cycle; and
        obtaining an average signal-to-noise ratio of all of the M signal-to-noise ratios of the downlink channel that correspond to each sub-cycle, and using the average signal-to-noise ratios as the M signal-to-noise ratios of the downlink channel of the UE.

4. The method according to claim 1, wherein after the obtaining a covariance matrix of the downlink channel according to the M signal-to-noise ratios of the downlink channel and the M equivalent codebooks, the method further comprises:
    performing, by the network side device, beamforming weighting processing on downlink data of the UE according to the covariance matrix.

5. An apparatus for obtaining downlink channel information, comprising:
    a processor, configured to perform precoding weighting on M channel state information-reference signals (CSI-RSs) of each of N sub-cycles in a cycle, wherein each sub-cycle is a quantity of measurement pilot subframes for bearing and transmitting the M CSI-RSs, N is a positive integer, and M is a quantity of CSI-RSs required by a predetermined antenna quantity;
    a transmitter configured to send the M weighted CSI-RSs of each sub-cycle to user equipment (UE); and
    a receiver, configured to receive M precoding matrix indicators (PMIs) and M channel quality indicators (CQIs) that are sent by the UE and that correspond to the M CSI-RSs of each sub-cycle, wherein the M PMIs and the M CQIs are obtained by the UE by separately measuring the M weighted CSI-RSs based on a set of rank 1 precoding codebooks corresponding to the predetermined antenna quantity; and
    the processor is further configured to: obtain M signal-to-noise ratios of a downlink channel of the UE according to the M CQIs of each sub-cycle; obtain M equivalent codebooks according to the M PMIs of each sub-cycle and weights of the precoding weighting; and obtain, according to the M signal-to-noise ratios of the downlink channel and the M equivalent codebooks, a covariance matrix of the downlink channel of the UE as the downlink channel information.

6. The apparatus according to claim 5, wherein the transmitter is further configured to: before the receiver receives M precoding matrix indicators (PMIs) and M channel quality indicators (CQIs) that are sent by the UE and that correspond to the M CSI-RSs of each sub-cycle, send the set of rank 1 precoding codebooks corresponding to the predetermined antenna quantity to the UE.

7. The apparatus according to claim 5, wherein when N is greater than or equal to 2, the processor is further configured to: before the transmitter sends the M weighted CSI-RSs of each sub-cycle to the user equipment (UE), weight the M CSI-RSs of each sub-cycle by using a power control factor that corresponds to each sub-cycle;
    obtain, according to the M CQIs of each sub-cycle and the power control factor used in each sub-cycle, the M signal-to-noise ratios of the downlink channel that correspond to each sub-cycle; and obtain an average signal-to-noise ratio of all of the M signal-to-noise ratios of the downlink channel that correspond to each sub-cycle, and use the average signal-to-noise ratios as the M signal-to-noise ratios of the downlink channel of the UE.

8. The apparatus according to claim 5, wherein the processor is further configured to perform beamforming weighting processing on downlink data of the UE according to the covariance matrix.

9. The apparatus according to claim 5, wherein the apparatus is a base station.

10. A network side device, comprising:
a processor, configured to perform precoding weighting on M channel state information-reference signals (CSI-RSs) of each of N sub-cycles in a cycle, wherein each sub-cycle is a quantity of measurement pilot subframes for bearing and transmitting the M CSI-RSs, N is a positive integer, and M is a quantity of CSI-RSs required by a predetermined antenna quantity;
a transmitter, configured to send the M weighted CSI-RSs of each sub-cycle to user equipment (UE); and
a receiver, configured to receive M precoding matrix indicators (PMIs) and M channel quality indicators (CQIs) that are sent by the UE and that correspond to the M CSI-RSs of each sub-cycle, wherein the M PMIs and the M CQIs are obtained by the UE by separately measuring the M weighted CSI-RSs based on a set of rank 1 precoding codebooks corresponding to the predetermined antenna quantity; and
the processor is further configured to: obtain M signal-to-noise ratios of a downlink channel of the UE according to the M CQIs of each sub-cycle; obtain M equivalent codebooks according to the M PMIs of each sub-cycle and weights of the precoding weighting; and obtain a covariance matrix of the downlink channel of the UE according to the M signal-to-noise ratios of the downlink channel and the M equivalent codebooks.

11. The network side device according to claim 10, wherein the transmitter is further configured to: before the receiver receives M precoding matrix indicators (PMIs) and M channel quality indicators (CQIs) that are sent by the UE and that correspond to the M CSI-RSs of each sub-cycle, send the set of rank 1 precoding codebooks corresponding to the predetermined antenna quantity to the UE.

12. The network side device according to claim 10, wherein if N is greater than or equal to 2, the processor is further configured to: before the transmitter sends the M weighted CSI-RSs of each sub-cycle to the user equipment (UE), weight the M CSI-RSs of each sub-cycle by using a power control factor that corresponds to each sub-cycle;
obtain, according to the M CQIs of each sub-cycle and the power control factor used in each sub-cycle, the M signal-to-noise ratios of the downlink channel that correspond to each sub-cycle; and obtain an average signal-to-noise ratio of all of the M signal-to-noise ratios of the downlink channel that correspond to each sub-cycle, and use the average signal-to-noise ratios as the M signal-to-noise ratios of the downlink channel of the UE.

13. The network side device according to claim 10, wherein the processor is further configured to perform beamforming weighting processing on downlink data of the UE according to the covariance matrix.

14. The network side device according to claim 10, wherein the network side device is a base station.

* * * * *

UNITED STATES PATENT AND TRADEMARK OFFICE
CERTIFICATE OF CORRECTION

PATENT NO. : 10,505,779 B2
APPLICATION NO. : 15/662964
DATED : December 10, 2019
INVENTOR(S) : Yang et al.

Page 1 of 1

It is certified that error appears in the above-identified patent and that said Letters Patent is hereby corrected as shown below:

On the Title Page

Item [57]: "CSI-RSs based on a set a rank 1 precoding codebooks" should read -- CSI-RSs based on a set of rank 1 precoding codebooks --.

In the Claims

Claim 3, Column 19, Line 63: "CQis" should read -- CQIs --.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*